United States Patent [19]

McCann

[11] Patent Number: 4,558,689
[45] Date of Patent: Dec. 17, 1985

[54] COMBUSTION GAS HEAT RECOVERY APPARATUS

[76] Inventor: Artie McCann, 12783 McKinley Rd., Orient, Ohio 43146

[21] Appl. No.: 623,906

[22] Filed: Jun. 25, 1984

[51] Int. Cl.⁴ ............................ F24H 3/12; F24H 3/02
[52] U.S. Cl. .................................... 126/117; 126/109; 126/99 A; 126/99 D; 126/110 R; 237/55; 165/901
[58] Field of Search .................. 126/117, 99 A, 99 D, 126/109, 118, 110 R; 165/DIG. 2, DIG. 12; 237/52, 53, 55; 110/253, 260

[56] References Cited

U.S. PATENT DOCUMENTS

| | | |
|---|---|---|
| 1,633,759 | 6/1927 | Breese, Jr. . |
| 2,265,501 | 12/1941 | Waltemade ........................ 126/117 |
| 2,902,265 | 9/1959 | Dubovick ..................... 165/DIG. 2 |
| 3,813,039 | 5/1974 | Wells . |
| 3,827,343 | 8/1974 | Darm . |
| 4,012,191 | 3/1977 | Lisankie et al. . |
| 4,079,885 | 3/1978 | Decker ................................ 237/55 |
| 4,106,474 | 8/1978 | Hunter et al. ................. 165/DIG. 2 |
| 4,122,823 | 10/1978 | Hunter ................................ 126/117 |
| 4,164,210 | 8/1979 | Hollowell ............................. 237/55 |
| 4,176,787 | 12/1979 | Gary . |
| 4,241,874 | 12/1980 | Schossow . |
| 4,308,990 | 1/1982 | Borovina et al. ..................... 237/55 |
| 4,336,791 | 6/1982 | Kitchhen ......................... 126/110 R |
| 4,342,359 | 8/1982 | Baker .................................. 237/55 |
| 4,392,610 | 7/1983 | Moskal . |
| 4,401,261 | 8/1983 | Brown . |
| 4,449,511 | 5/1984 | Hays et al. ........................ 126/117 |
| 4,478,206 | 10/1984 | Ahn ................................. 126/99 A |

FOREIGN PATENT DOCUMENTS

| | | | |
|---|---|---|---|
| 2926700 | 1/1981 | Fed. Rep. of Germany ........ 237/55 |
| 609835 | 10/1948 | United Kingdom ................ 126/117 |

Primary Examiner—James C. Yeung
Assistant Examiner—H. A. Odar
Attorney, Agent, or Firm—Biebel, French & Nauman

[57] ABSTRACT

A secondary heat exchanger is positioned within a cold air return plenum of a forced air gas or oil fired furnace to preheat cold air drawn into the furnace through the cold air plenum. A heat recovery flue pipe is connected between a primary flue pipe of the furnace and the secondary heat exchanger, and an exhaust pipe is connected between the secondary heat exchanger and the outside of a structure served by the furnace. A secondary blower coupled to the exhaust pipe draws hot combustion gases from the primary flue pipe through the heat exchanger and exhausts cooled combustion gases to the outside. The secondary heat exchanger comprises a combustion gas inlet plenum and a combustion gas outlet plenum, with a plurality of heat conducting pipes sealingly connected therebetween. Each of the heat conducting pipes is arranged to define a circuitous path between the inlet plenum and the outlet plenum, with each heat conducting pipe defining at least two aligned linear radiating surfaces over which cold air is drawn. Heat conducting fins are intimately connected to the heat conducting pipes and a condensate drain is provided in the lower extremities of the heat conducting pipes to drain condensate from the secondary heat exchanger.

2 Claims, 3 Drawing Figures

COMBUSTION GAS HEAT RECOVERY APPARATUS

BACKGROUND OF THE INVENTION

This invention relates generally to apparatus for upgrading existing gas or oil fired furnaces and, more particularly, to combustion gas heat recovery apparatus for use with such existing furnaces.

In these times of ever increasing fuel prices, great effort has been expended to extract a maximum amount of heat from a given amount of fuel. These efforts have led to new furnace designs which are extremely efficient, with many designs boasting efficiencies around the 90 percentile mark. Unfortunately, in the recent past when fuel costs were not as severe, furnace design was more devoted to decreasing the cost and size of the central heating units, and it was a common practice to minimize the heat exchanger. The frequent result was that a substantial amount of the generated heat was allowed to wastefully flow up the chimney. Presently, many such inefficient furnaces are in use and can be expected to perform for many more years of effective, even though inefficient, operation.

While these inefficient furnaces could be replaced by the newer, high efficiency designs, the costs involved are prohibitive. To improve the efficiencies of these furnaces, a variety of combustion gas or flue gas heat recovery systems have been developed. One common variety of flue gas heat recovery system involves the installation of a heat exchanger into a flue pipe which interconnects the furnace to a chimney such that the hot flue gases flow through a sealed passage of the heat exchanger. Ambient air is drawn through the heat exchanger to extract heat from the flue gases with the heated air remaining in the room which contains the furnace. An example of such a flue gas heat recovery system is disclosed in U.S. Pat. No. 3,813,039.

Unfortunately, the furnace room normally is not where additional heat recovered from the flue gases is required. Systems have been developed which circulate the recovered heat throughout the structure being served by the furnace. Some of these systems directly pass flue gases to a heat exchanger connected to preheat cold air which is drawn into a furnace and then further heated within the furnace as exemplified by U.S. Pat. Nos. 4,176,787 and 4,241,874. Other systems utilize a heat conveying fluid which is contained within a sealed system. The fluid is heated in a heat exchanger in intimate contact with the furnace flue pipe or over which heated combustion gases are passed, with the heated fluid being circulated to a second heat exchanger positioned within the cold air return path of the furnace where the heat is extracted from the fluid. Systems of this type are exemplified by U.S. Pat. Nos. 4,392,610 and 4,401,261.

While the noted systems provide heat recovery from the hot combustion or flue gases of existing furnaces, their efficiencies do not approach the high efficiencies of the improved furnace designs which are now available. It is thus apparent that the need exists for a combustion gas heat recovery system to upgrade existing gas or oil fired furnaces to improve the efficiencies of the existing furnaces to rival those of the newer furnace designs and which can be installed at a fraction of the cost of replacing the existing furnaces.

SUMMARY OF THE INVENTION

In accordance with the present invention, combustion gas heat recovery apparatus for upgrading an existing forced air gas or oil fired furnace provides for drawing heated combustion gas from a primary flue pipe of the furnace through a secondary heat exchanger positioned such that cold air drawn into the furnace through a cold air return plenum is initially drawn through the secondary heat exchanger to be preheated prior to being forced through a furnace primary heat exchanger. A heat recovery flue pipe is connected between the primary flue pipe of the furnace and the secondary heat exchanger and an exhaust pipe for cooled combustion gases is connected between the secondary heat exchanger and the outside of a structure served by the furnace. A secondary blower coupled to the exhaust pipe is operated to draw hot combustion gases from the primary flue pipe through the heat recovery flue pipe and the heat exchanger, and to exhaust cooled combustion gases outside the structure served by the furnace.

The novel secondary heat exchanger of the present invention defines a combustion gas passage and a fresh air passage isolated from one another. The secondary heat exchanger comprises a combustion gas inlet plenum and a combustion gas outlet plenum with a plurality of heat conducting pipes sealingly connected therebetween to pass combustion gases from the inlet plenum to the outlet plenum. The interiors of the inlet plenum, the heat conducting pipes and the outlet plenum define the combustion gas passage and the exteriors of the heat conducting pipes enclosed within an appropriate enclosure define the fresh air passage.

Each of the heat conducting pipes is arranged in a serpentine pattern to define a circuitous path between the inlet plenum and the outlet plenum with each heat conducting pipe defining at least two linear radiating surfaces within the fresh air passage. Heat conducting fins are intimately connected to the heat conducting pipes to expand the surface area of the heat exchanger. Condensate drainage means is coupled to the heat conducting pipes for draining condensate from the heat exchanger.

Preferably, the condensate drain includes a trap to permit condensate to drain therefrom, but prevent air or other fluid from being drawn into the heat exchanger. An access port on the combustion gas inlet plenum permits the heat exchanger to be quickly and conveniently cleaned during normal maintenance of the furnace or in the event that the heat exchanger becomes fouled.

The apparatus in accordance with the present invention provides for inherent switch-over to an existing chimney flue in the event blockage prevents the combustion gases from being drawn through the secondary heat exchanger. This is due to the fact that the existing chimney flue remains intact and, in the event of blockage of the combustion gas heat recovery apparatus, the flue gases exit by the existing chimney flue rather than being drawn through the heat recovery apparatus. The furnace then operates in its normal mode until the system is cleaned with cleaning being facilitated by the cleaning access port provided on the combustion gas inlet plenum.

It is, therefore, an object of the present invention to provide improved combustion gas heat recovery apparatus for upgrading existing gas or oil fired furnaces which increases the efficiency of the furnace to approximate the efficiencies of the newer furnace designs, but at a fraction of the cost of replacing the existing furnace such that existing furnaces having extended life expectancies can be utilized at higher efficiencies and replaced only when the existing furnaces wear out.

Other objects and advantages of the invention will be apparent from the following description, the accompanying drawings and the appended claims.

DETAILED DESCRIPTION OF THE INVENTION

Figure 1:
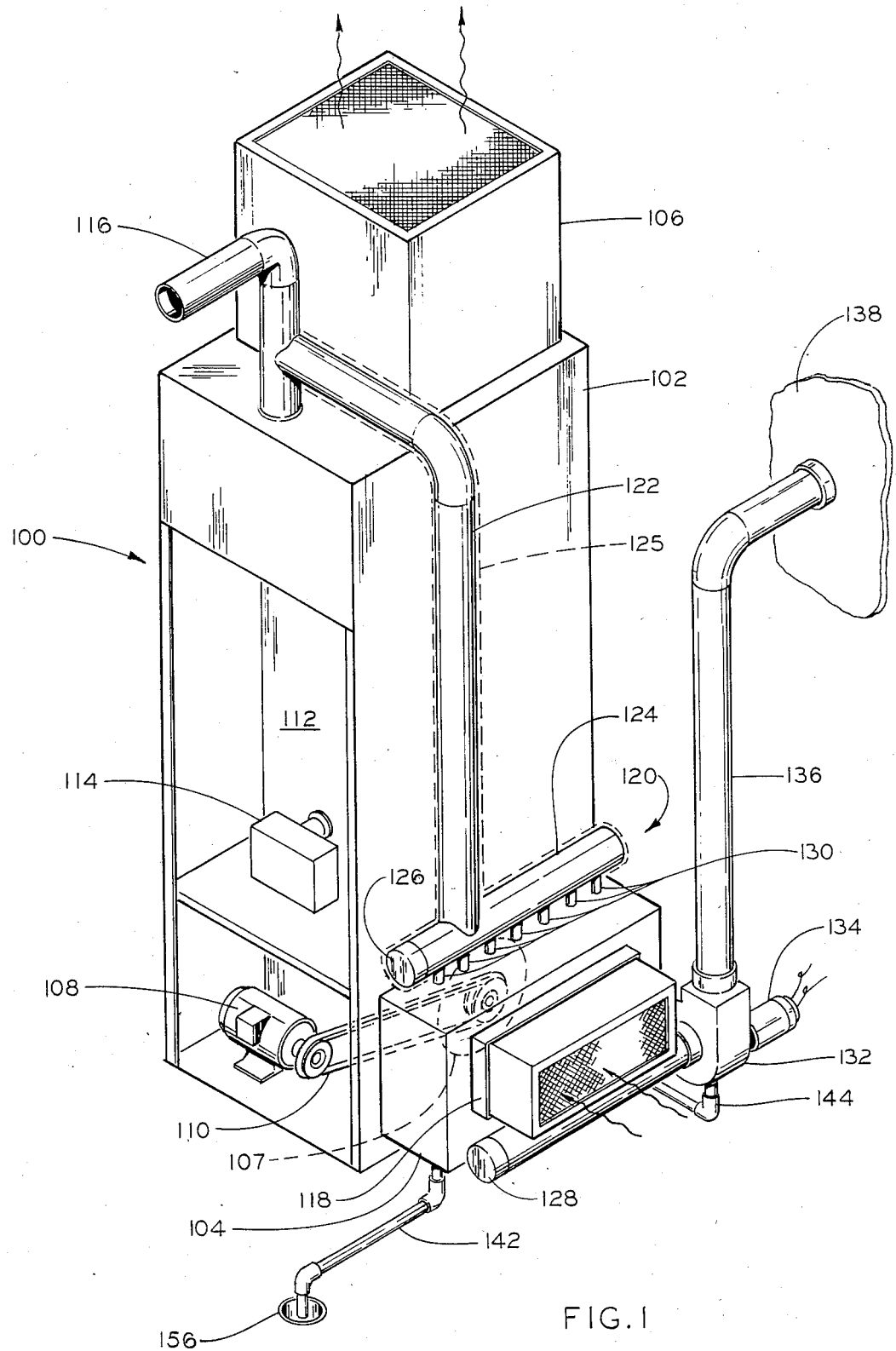
FIG. 1 is a perspective view of a furnace equipped with the combustion gas heat recovery apparatus of the present invention.

FIG. 1 is a perspective of a furnace 100 equipped with the combustion gas heat recovery apparatus of the present invention. The furnace 100 may be used to heat a house, apartment building, commercial structure or the like, and includes an outer housing 102. Cold air is drawn into the furnace 100 via a cold air return plenum 104 and heated air is blown from the furnace 100 via a hot air exhaust plenum 106 which is connected to duct work (not shown) to distribute the heated air throughout the structure being served by the furnace 100.

Cold air is drawn into the cold air return plenum 104 by means of a primary blower 107 which is driven by a motor 108 through a continuous belt 110. The cold air is forced through a primary heat exchanger 112 which generally comprises the central portion of the furnace 100. A gas or oil burner 114 is connected to control combustion of the corresponding fuel within the heat exchanger 112. The heated combustion gases are passed to a primary flue pipe 116 and from there to a conventional chimney flue (not shown) for exhausting the gases outside the structure served by the furnace 100. A conventional filter 118 is provided to filter the air drawn into the furnace 100.

In accordance with the present invention, combustion or flue gas heat recovery apparatus is used with the existing furnace 100 to preheat the cold air drawn through the cold air plenum 104 prior to being passed through the primary heat exchanger 112 of the furnace 100. A secondary heat exchanger 120, the structure of which is more fully disclosed in FIGS. 2 and 3 and will be described hereinafter, is positioned such that air drawn through the cold air return plenum 104 passes through a fresh air passage of the secondary heat exchanger 120. In the illustrative embodiment of the present invention, the heat exchanger 120 is installed on the furnace 100 such that at least a portion of the secondary heat exchanger 120 extends within the cold air return plenum 104 which effectively defines the fresh air passage through the secondary heat exchanger 120.

A heat recovery flue pipe 122, preferably of the same diameter as the primary flue pipe 116, is connected to the primary flue pipe 116 at a location near the exit point of the primary flue pipe 116 from the furnace 100. This location of the connection between the primary flue pipe 116 and the heat recovery flue pipe 122 ensures that the hottest flue gases are drawn from the primary flue pipe 116 by the heat recovery apparatus. This connection maintains the two flue pipes 116 and 122 at the highest possible temperature to ensure that no condensate forms within the flue pipes 116 and 122 and, hence, no condensate is discharged into the primary heat exchanger 112 of the furnace 100. Condensate, which is of a slightly acid character, if permitted to flow into the primary heat exchanger 112, would rapidly deteriorate and destroy the primary heat exchanger.

The heat recovery flue pipe 122 is connected into the primary flue pipe 116 to permit free access to hot flue gases. However, the heat recovery flue pipe 122 is nonintrusive, i.e., does not extend appreciably into the primary flue pipe 116, such that the normal flow of flue gases is not obstructed by the interconnection, and no appreciable portion of the heat recovery flue pipe is present to accumulate soot or other contaminants.

The heat recovery flue pipe 122 is connected into the secondary heat exchanger 120 through a combustion gas inlet plenum 124. The combustion gas inlet plenum 125 is preferably of approximately the same cross-sectional area as the heat recovery flue pipe 122 to permit free flow of the flue gases through the heat exchanger 120. As shown in the illustrative embodiment, the combustion gas inlet plenum 124 is constructed as a cylindrical tube or section of pipe which can be the same as the flue pipe 122. It is noted, however, that any formation of the inlet plenum 124 having sufficient volume to permit unrestricted flue gas flow can be used in the present invention.

An access port 126 is provided on the combustion gas inlet plenum 124 to facilitate cleaning of the secondary heat exchanger 120. The heat recovery flue pipe 122 and combustion gas inlet plenum 124 are preferably covered by a layer of insulation 125, indicated in dashed lines in FIG. 1, to prevent cooling of the combustion gases therein and to cover high temperature surfaces along the furnace outer housing 102.

A combustion gas outlet plenum 128 is provided near the bottom of the secondary heat exchanger 120 in the illustrative embodiment. It is noted that the specific locations and orientations of the combustion gas inlet plenum 124 and the combustion gas outlet plenum 128 are unimportant to the present invention. The inlet plenum 124 and outlet plenum 128 may be at alternate levels, as shown in the illustrative embodiment, adjacent to one another, or at any convenient location relative to one another as determined by the particular furnace to which the secondary heat exchanger 120 is to be fitted.

Preferably, the combustion gas outlet plenum 128 is of a cross-sectional area equal to the cross-sectional areas of the heat recovery fluid pipe 122 and the combustion gas inlet plenum 124. As shown in the illustrative embodiment, the combustion gas outlet plenum 128 is formed as a cylindrical tube or section of pipe; however, as with the combustion gas inlet plenum 124, the particular formation of the combustion gas outlet plenum 128 is unimportant to the present invention.

Figure 2:
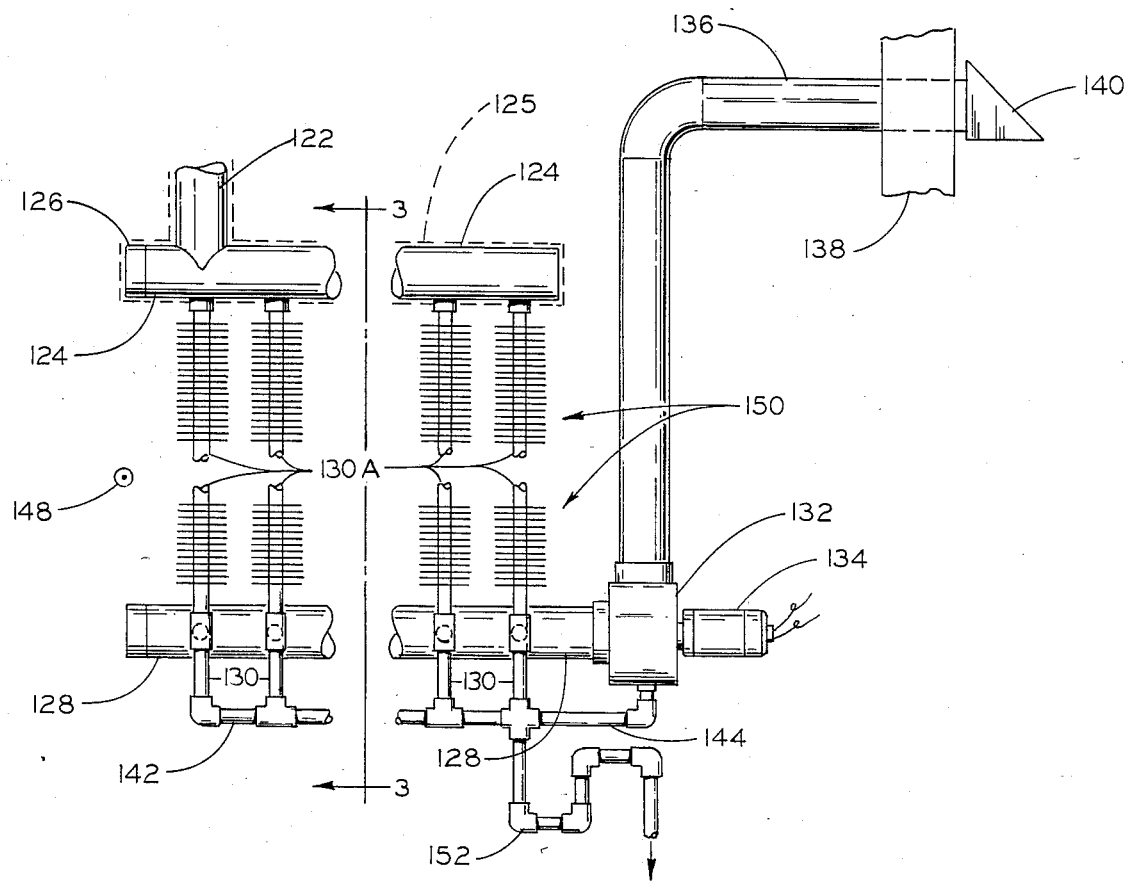
FIG. 2 is a diagrammatic view illustrating the apparatus and the operation of the present invention.

A plurality of heat conducting pipes 130 are sealingly connected between the combustion gas inlet plenum 124 and the combustion gas outlet plenum 128 and are more fully shown in FIGS. 2 and 3, as will be described hereinafter. The combustion gas outlet plenum 128 is connected to a secondary blower 132 which is driven by an electric motor 134. A cooled combustion gas exhaust pipe 136 is connected between the secondary blower 132 and the outside of the structure being served by the furnace 100 as represented by a sectional portion of wall 138. The outlet of the cooled combustion gas exhaust pipe 136 is preferably protected by a hood 140 of conventional design as shown in FIG. 2. Preferably, the cooled combustion gas exhaust pipe 136 is of a cross-sectional area equal to the cross-sectional areas of the heat recovery flue pipe 122, the combustion gas inlet plenum 124 and the combustion gas outlet plenum 128.

The secondary blower 132 is activated upon activation of the burner 114 to draw heated combustion gases from the primary flue pipe 116 through the heat recovery flue pipe 122 and the secondary heat exchanger 120. The heated flue gases pass through the combustion gas inlet plenum 124, the heat conducting tubes 130 and the combustion gas outlet plenum 128 of the secondary heat exchanger 120 and are exhausted through the cooled combustion gas exhaust pipe 136 to the outside of the structure utilizing the furnace 100. Activation of the secondary blower 132 with the burner 114 serves to preheat the combustion gas heat recovery apparatus prior to activation of the primary furnace blower 107.

Due to the high level of heat extraction within the secondary heat exchanger 120, the combustion gases condensate within the combustion gas passage of the secondary heat exchanger 120. Accordingly, condensate drainage means 142 are coupled to the secondary heat exchanger 120 for draining the condensate formed. An additional condensate drain 144 may be provided from the secondary blower 132 or from the cooled combustion gas exhaust pipe 136 if the exhaust pipe 136 is configured such that it is lower than the secondary blower 132 or both. Due to the acidic nature of the condensate, the combustion gas outlet plenum 128 and the blower 132 are preferably formed from stainless steel. Since little or no condensate is formed in the cooled combustion gas exhaust pipe 136, it is preferably formed from less expensive and lighter weight aluminum.

The novel structure of the secondary heat exchanger 120 in accordance with the present invention will now be described with reference to FIGS. 2 and 3. As previously mentioned, a plurality of heat conducting pipes 130 formed from copper or other appropriate material sealingly interconnect the combustion gas inlet plenum 124 and the combustion gas outlet plenum 128. All interconnections within the secondary heat exchanger 120 are preferably made with silver solder to ensure the integrity of the apparatus.

Figure 3:
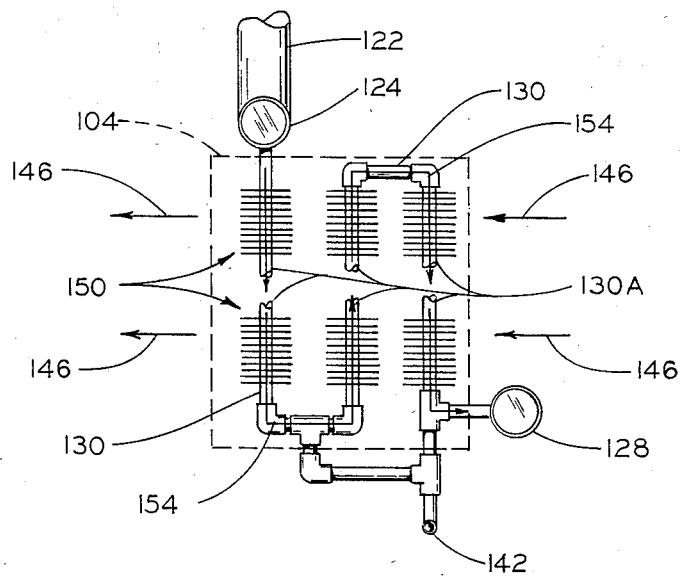
FIG. 3 is a sectional view through the heat exchanger of the present invention.

As best shown in FIG. 3, each of the heat conducting pipes 130 is arranged in a serpentine pattern to define a circuitous path between the combustion gas inlet plenum 124 and the combustion gas outlet plenum 128. The circuitous path between the combustion gas inlet plenum 124 and the combustion gas outlet plenum 128 preferably comprises at least two linear radiating surfaces 130A within the fresh air passage of the secondary heat exchanger 120. The linear radiating surfaces 130A, three shown in the illustrative embodiment, are aligned with the direction of air flow through the fresh air passage of the secondary heat exchanger 120 as shown by the arrows 146 directed to the left in FIG. 3, and the arrowhead 148 coming out of the plane of FIG. 2.

The linear radiating surfaces 130A are preferably cylindrical as in the illustrative embodiment to provide minimum impediment to the air flow through the secondary heat exchanger 120; however, heat conducting pipes 130 of any cross-sectional geometry can be utilized in the present invention. While three linear radiating surfaces 130A are shown in the illustrative embodiment, 2, 4, 5, or any reasonable number of such surfaces can be formed in accordance with the present invention.

The circuitous paths formed by the heat conducting pipes 130 expands the radiating surfaces within the secondary heat exchanger 120 and are necessary to effectively slow the heated flue gases as they pass through the secondary heat exchanger 120. By slowing the flow of heated flue gases, a maximum amount of heat can be withdrawn from the flue gases by the fresh air passing through the secondary heat exchanger 120. Heat conducting fins 148 are intimately connected to the heat conducting pipes 130 to further expand the radiating surfaces within the secondary heat exchanger 120. The heat conducting fins are aligned for minimum resistance to air flow through the fresh air passage of the secondary heat exchanger 120.

Drainage means 142 are connected to the lower extremities of the heat conducting pipes 130 for draining condensate formed within the heat conducting pipes 130 to a condensate trap 152 which is shown as a P-type trap. Of course, any type of appropriate check valve can be used in place of the P-type trap. As previously noted, aligned the majority of the condensate will be formed within the heat conducting pipes 130 and particularly within the cooler portions of the pipes 130 toward the combustion gas outlet plenum 128, a condensate drain 144 may be provided from the secondary blower 132 and/or the cooled combustion gas exhaust pipe 136.

The condensate trap 152 permits condensate to drain from the secondary heat exchanger 120, but prevents air or other fluids from being drawn into the heat conducting pipes 130. This ensures that combustion gases pass from the combustion gas inlet plenum 124 to the combustion gas outlet plenum 128 through the circuitous path defined by the heat conducting pipes 130 as shown by the arrows 154 in FIG. 3.

In summary, operation of the combustion gas heat recovery apparatus in accordance with the present invention will now be described. Upon a call for heat from a conventional thermostatic device, the furnace 100 activates the burner 114 with the secondary blower 132 being activated at the same time. As the temperature of the primary heat exchanger 112 of the furnace increases toward the operating temperature of the furnace 100, hot combustion gases pass up the primary flue pipe 116. The hot combustion or flue gases are drawn into the heat recovery apparatus of the present invention through the heat recovery flue pipe 122 and the secondary heat exchanger 120 by means of the secondary blower 132 which then exhausts the combustion gases outside the structure utilizing the furnace 100 through the combustion gas exhaust pipe 136.

The period of time prior to activation of the primary furnace blower 107 serves to preheat the combustion gas heat recovery apparatus of the present invention. Alternately, it may be desirable to lower the temperature for activation of the primary furnace blower 107 since hot flue gases are present in the secondary heat exchanger prior to attaining the normal activation temperature for the primary furnace blower. Such a reduction in the activation temperature of the primary furnace blower 107 serves to extract even more heat from the hot flue gases.

In any event, once the primary furnace blower 107 is activated, cold air is drawn through the cold air return plenum 104 where it passes through the secondary heat exchanger 120 and is preheated prior to being forced through the primary heat exchanger 112 of the furnace 100. As the combustion gases or flue gases are cooled by means of the incoming cold air through the cold air plenum 104, condensate formed within the heat conducting pipes 130 is drained to a floor drain 156 via condensate drainage means 142, and any condensate formed within the secondary blower 132 or the cooled combustion gas exhaust pipe 136 is drained through drainage means 144.

Once the thermostat controlling the furnace 100 registers the desired temperature, the burner 114 is deactivated which may deactivate the secondary blower 132 since flue gases within the furnace primary flue 116 rapidly cool once the burner 114 has been deactivated. Alternately, it may be desirable to maintain the operation of the secondary blower 132 until the primary furnace blower 107 has been deactivated. Once the primary furnace blower 107 has cooled the primary heat exchanger 112 of the furnace 100, it is deactivated to await further commands for additional heat to be generated by the furnace 100.

Relatively large amounts of heat are recovered from the hot flue gases of an existing furnace when the heat recovery apparatus of the present invention has been installed on the furnace. Accordingly, in many applications, it may be desirable to reduce the energy input, typically measured in B.T.U.'s, to a furnace equipped with the present invention. The input energy reduction which is accomplished by reducing the size of the gas or oil burner jets within the furnace is made up by the recovery of heat from the hot flue gases of the furnace. Such modifications to the furnace further increase the efficient operation and reduces the amount of fuel used by the furnace.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. Combustion gas heat recovery apparatus for installation on an existing forced air gas or oil fired furnace having a primary heat exchanger including a gas or oil burner, a primary flue pipe for carrying heated combustion gases from said primary heat exchanger to a primary gas exhaust flue, a cold air return plenum, and a primary blower for drawing air to be heated from said cold air plenum and forcing it through said primary heat exchanger from which it is distributed within the structure heated by said furnace, said apparatus comprising:

a secondary heat exchanger defining a combustion gas passage and a fresh air passage for air to be heated, which passages are isolated from one another, said secondary heat exchanger being positioned such that air drawn from said cold air return plenum is initially drawn through said secondary heat exchanger to be preheated by extracting heat from said combustion gases prior to being forced through said primary heat exchanger, said secondary heat exchanger comprising a combustion gas inlet plenum, a combustion gas outlet plenum, a plurality of heat conducting pipes sealingly connected between said inlet plenum and said outlet plenum, each of said heat conducting pipes being arranged in a serpentine pattern to define a plurality of linear radiating surfaces aligned in the direction of air flow through said heat exchanger, and heat conducting fins intimately connected to said heat conducting pipes, said primary flue pipe, said combustion gas inlet plenum and said combustion gas outlet plenum having approximately the same cross-sectional area to permit unrestricted flue gas flow;

a heat recovery flue pipe connected between said primary flue pipe and said secondary heat exchanger for passing combustion gases from said primary flue pipe to said combustion gas passage of said secondary exchanger, said heat recovery flue pipe being insulated and nonintrusively connected into said primary flue pipe such that the preheating of air by said secondary heat exchanger is maximized and free access to heated combustion gases is provided, but not substantial portion of said heat recovery flue pipe extends into said primary flue pipe to thereby obstruct the normal flow of flue gases or accumulate soot and other contaminants;

a cooled combustion gas exhaust pipe connected between said combustion gas outlet plenum of said secondary heat exchanger and the outside of said structure for passing cooled combustion gases from said secondary heat exchanger to the outside of said structure.

a secondary blower coupled to said exhaust pipe and operable to draw heated combustion gases from said primary flue pipe through said heat recovery flue pipe and secondary heat exchanger, and to exhaust cooled combustion gases received from said secondary heat exchanger to the outside of said structure through said exhaust pipe; and condensate drainage means coupled to said secondary heat exchanger for draining condensate formed within said combustion gas heat recovery apparatus, said condensate drainage means comprising interconnected taps along the lower extremities of said heat conducting pipes and a condensate trap to permit condensate to drain from said secondary heat exchanger but prevent air or other fluids from being drawn into said apparatus.

2. Combustion gas heat recovery apparatus as claimed in claim 1 further comprising an access port on said combustion gas inlet plenum whereby said apparatus can be quickly and conveniently cleaned during normal maintenance of said furnace or in the event that said apparatus becomes fouled.

* * * * *

UNITED STATES PATENT AND TRADEMARK OFFICE
CERTIFICATE OF CORRECTION

PATENT NO. : 4,558,689
DATED : December 17, 1985
INVENTOR(S) : Artie McCann

It is certified that error appears in the above—identified patent and that said Letters Patent is hereby corrected as shown below:

Col. 4, line 19, "125" should read --124--.

Col. 4, line 51, "fluid" should read --flue--.

Col. 6, line 23, "aligned" should read --although--.

Col. 8, line 22, after "secondary" insert --heat--.

Col. 8, line 27, "not" should read --no--.

Signed and Sealed this

Twentieth Day of May 1986

[SEAL]

Attest:

DONALD J. QUIGG

Attesting Officer    Commissioner of Patents and Trademarks